Patented Aug. 25, 1925.

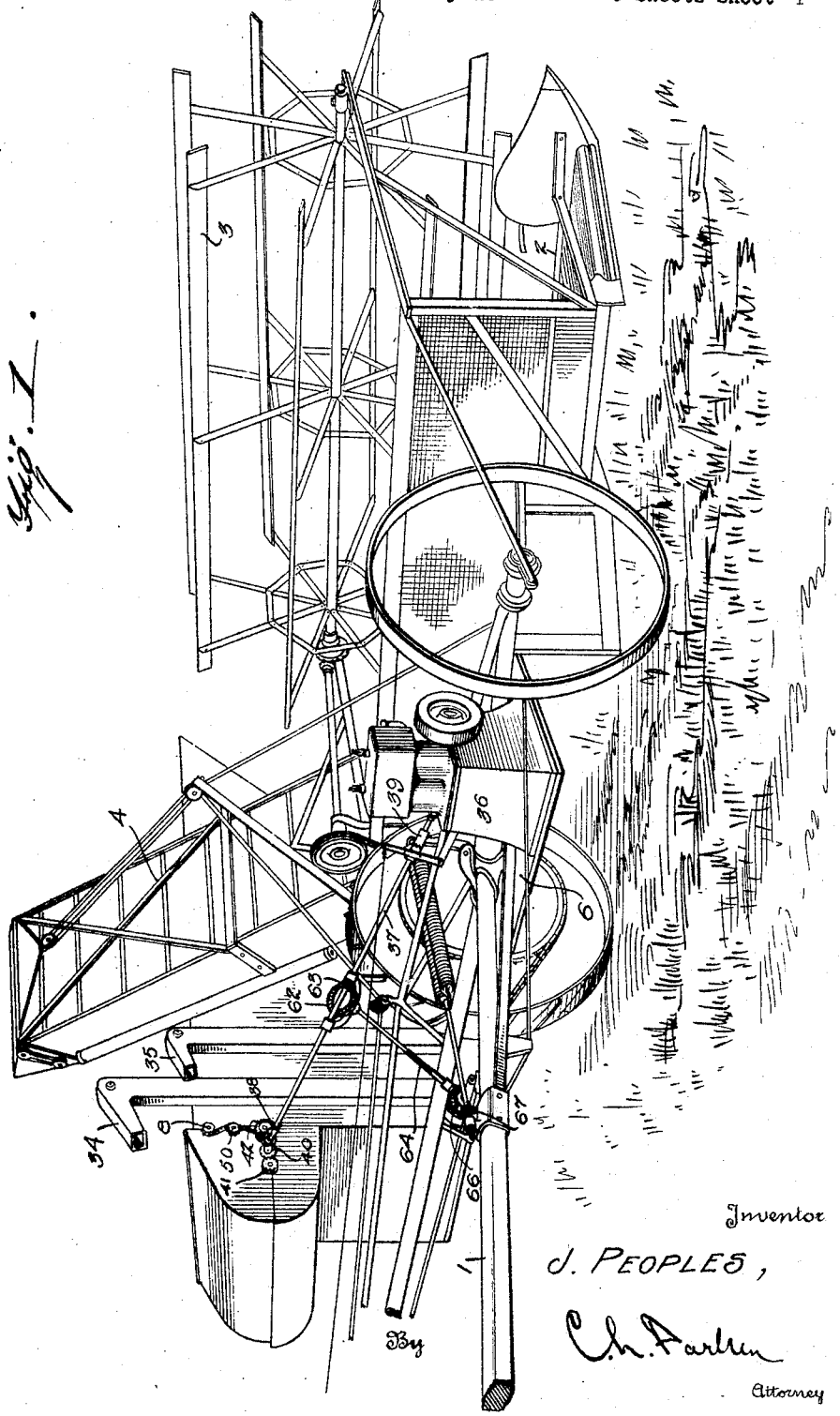

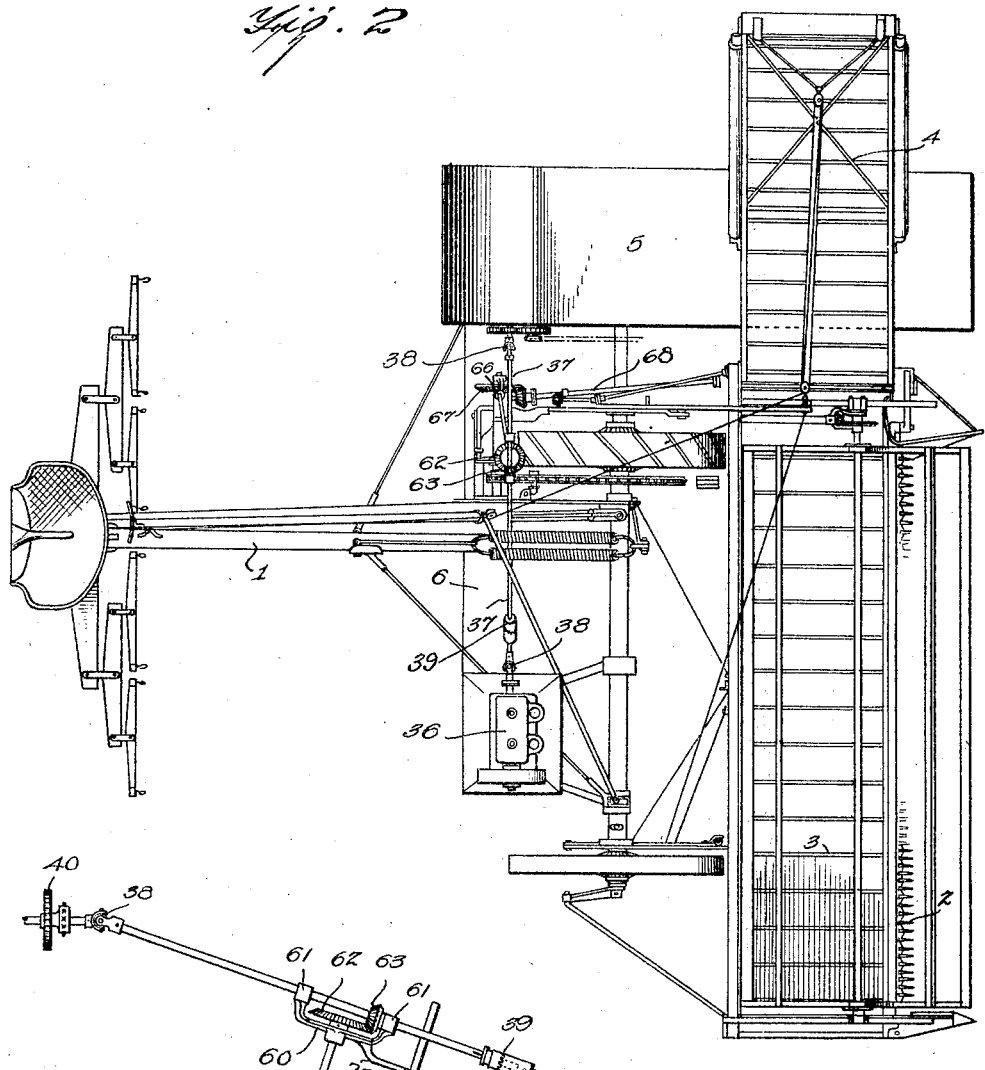

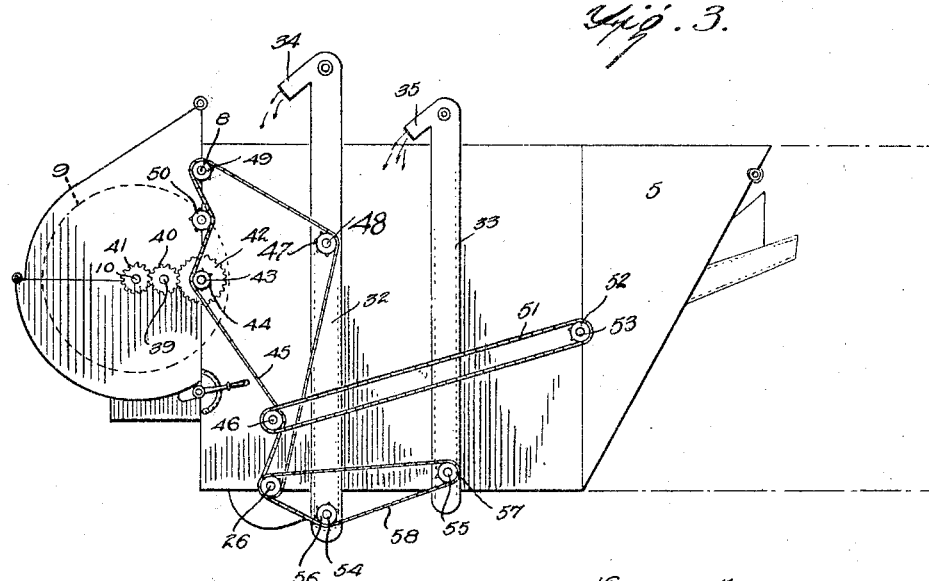
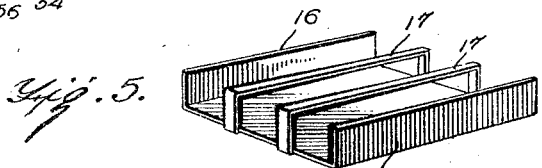
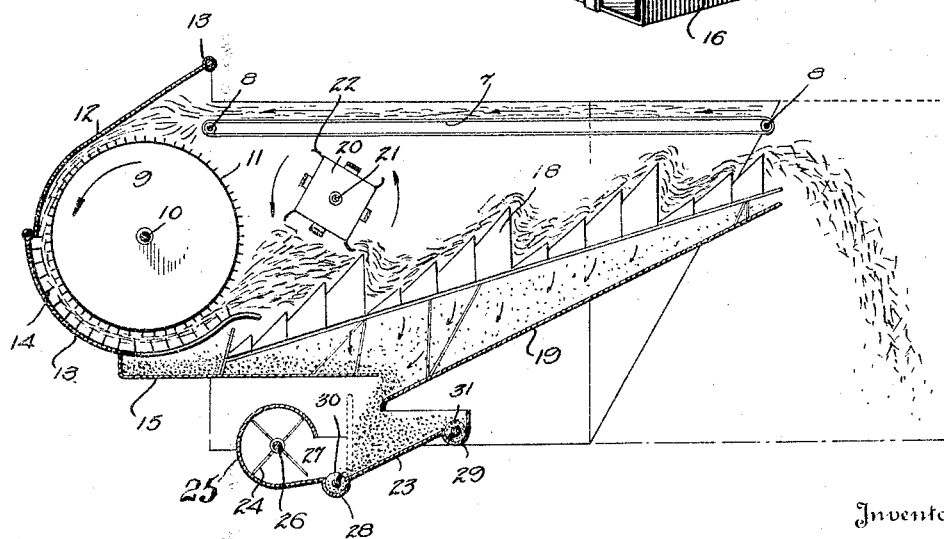

1,551,115

UNITED STATES PATENT OFFICE.

JETHRO PEOPLES, OF CULLISON, KANSAS.

THRASHING MACHINE.

Application filed May 29, 1922, Serial No. 564,470. Renewed February 9, 1925.

*To all whom it may concern:*

Be it known that I, JETHRO PEOPLES, a citizen of the United States, residing at Cullison, in the county of Pratt and State of Kansas, have invented certain new and useful Improvements in Thrashing Machines, of which the following is a specification.

This invention relates to thrashing machines, and more particularly to thrashing attachments for grain headers.

An object of the invention is the provision of a thrashing machine which may be attached to any type of grain header and used in conjunction therewith.

A further object is the provision of an attachment including a motor and suitable connections by means of which the thrashing attachment may be operated. The motor is further connected by suitable gearing to the operating parts of the header to drive it.

In the accompanying drawings, I have shown one embodiment of the invention. In this showing:

Figure 1 is a perspective view of a portion of a header showing the thrasher attached, Figure 2 is a plan view, Figure 3 is a side elevation of the thrasher detached, Figure 4 is a vertical longitudinal sectional view of the thrasher, Figure 5 is a detail view of a grain pan, and, Figure 6 is a detail view of the gearing connecting the thrasher and header to the motor.

Referring to the drawings, the reference numeral 1 designates generally the frame of a grain heading machine of any type. This machine is provided with suitable heading implements 2 at its forward end and is further provided with a transverse conveyor or belt 3 arranged behind the cutting implements to convey the cut grain to one side of the machine. The transverse conveyor communicates with an inclined conveyor 4.

The attachment forming the subject matter of the present invention consists of a frame or casing 5 which is supported on suitable supports or beams 6, secured to the frame of the header. As shown, the casing is provided with an open top, and an endless belt 7 is arranged adjacent the top of the casing. This belt passes over shafts 8, traveling in the direction of the arrows to convey the grain rearwardly. A cylinder 9 is mounted on a shaft 10 at the rear of the attachment and this cylinder is provided with the usual thrashing elements 11. The cylinder is provided with a cover 12, mounted on a suitable hinge 13 to permit access to the interior of the machine. The bottom of the cylinder is closed by a curved plate 13 which is mounted to permit adjustment and this plate is provided with spaced thrashing implements 14.

A grain pan 15 is arranged adjacent the drum and this pan is provided with side walls or flanges 16 (see Figure 5). It is further provided with upwardly extending members 17 arranged parallel to the flanges and spaced therefrom to prevent the thrashed grain from lodging at one side of the grain pan. Straw racks 18 are arranged within the casing and are secured to an inclined grain pan 19. A beater 20 is arranged on a shaft 21 above the straw racks and is provided with beating elements or blades 22. The grain pans 15 and 19 communicate with a compartment 23. A fan 24 is arranged within a fan casing 25 on a shaft 26 and this casing is provided with an opening 27 communicating with the compartment 23. The opposite sides of the bottom of the grain compartment 23 are provided with substantially semi-circular portions 28 and 29, adapted to receive screw conveyors 30 and 31. The ends of these conveyors communicate with vertical conveyors 32 and 33. The conveyor 32 is for clean grain and is provided with an outlet 34 adapted to deliver grain into a receptacle. The conveyor 33 is provided with an outlet 35 adapted to return partially thrashed grain to the apron 7.

The thrasher is driven from a motor 36 supported by the beams 6 forming the frame of the thrashing attachment through the provision of a main shaft 37. This shaft is provided with universal joints 38 adjacent each end, and is further provided with a clutch 39 to permit the machine to be stopped and started. A pinion 40 is arranged on the end of the main shaft and meshes with a pinion 41 on the shaft 10, of the drum. The pinion also meshes with a pinion 42 on a stub shaft 43. This shaft is provided with a sprocket 44 adapted to receive a chain 45. This chain passes downwardly over a sprocket on a shaft 46 which operates the straw rack 18 and thence downwardly over a sprocket on fan shaft 26. The chain then passes over a sprocket 47 on the stub shaft 48 and sprocket 49 on one of the apron shafts 8, thence over an idler sprocket 50. The idler sprocket is provided for regulating the tension of the chain. The opposite end of the straw rack is controlled by a chain 51 passing over a sprocket on the shaft 46 and a sprocket 52 on a shaft 53. The conveyors 28 and 29 are provided with shafts 54 and 55, having sprockets 56 and 57 on their ends. These sprockets are adapted to receive a chain 58 passing over a sprocket on the fan shaft 26.

The grain header is driven from the main shaft by means of a stub shaft 59. The end of this shaft is received in a yoke 60, having sleeves 61 surrounding the main shaft. The shaft 59 is provided with a bevel gear 62, meshing with a bevel pinion on the main shaft. This shaft is provided with a squared portion 64 adapted to be received in a square opening in a sleeve 65 slidably mounted on the end of the shaft. The sleeve is provided with a bevel pinion 66, meshing with a gear 67 on the main shaft 68 of the header mechanism. The lower end of shaft 59 is supported by a bearing member 69. This bearing member is provided with a sleeve 70 surrounding the main header shaft 68, and a second sleeve 71 surrounding the lower end of the shaft 59.

The sleeve 65 is provided with a groove 72 adapted to receive the ends of a yoke 73, carried by an arm 74. As shown, this arm is extended upwardly parallel to the shaft 59, as at 75, and is slidably mounted in a bracket 76 carried by an arm 77 depending from the yoke 60.

The operation of the device will be apparent from the foregoing description. By means of the present invention, a small portable thrasher is provided which may be attached to a grain header and used therewith. A complete machine for cutting grain and thrashing it is obtained when the attachment is secured to a grain header. The motor drives the thrashing machine through the gearing heretofore described and the grain delivered to the apron 7 is conveyed rearwardly to the drum and around the drum to separate the grain from the straw. The grain falls into the grain pans and is delivered to the grain compartment 23, the straw passing over the straw racks as indicated in the drawings. As stated, the motor 36 may be employed for driving the header by placing gears 66 and 67 in mesh. When the operator desires to drive the thrashing machine, without operating the header, the sleeve 65 is moved upwardly on shaft 59 until the gears 66 and 67 are disengaged.

The sleeve is moved upwardly by moving the extended portion 75 of the arm 74 rearwardly in the bracket 76. The ends of the yoke 73 ride in the groove 72 of the sleeve, permitting revolution of the sleeve independently of the yoke.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

Drive mechanism for combined harvesting and thrashing machines comprising a motor mounted on the frame of the machine, a main shaft driven by said motor, connecting means between said shaft and said thrasher, a pair of sleeves surrounding said main shaft, a yoke connected to said sleeves, a counter shaft supported in said yoke, gearing connecting said counter shaft to said main shaft, said counter shaft being provided with a squared end, a sleeve mounted on the end of said counter shaft and provided with a squared opening, a beveled gear mounted on said sleeve, a gear carried by the header mechanism and meshing with said beveled gear, and a bearing member supporting said sleeve and the end of said counter shaft.

In testimony whereof I affix my signature.

JETHRO PEOPLES.